United States Patent
Vogel

(10) Patent No.: US 7,325,305 B2
(45) Date of Patent: Feb. 5, 2008

(54) METHOD FOR PRODUCING A BUILT SHAFT

(75) Inventor: Manfred Vogel, Kappelrodeck (DE)

(73) Assignee: Neumayer Tekfor GmbH, Hausach (DE)

(*) Notice: Subject to any disclaimer, the term of this patent is extended or adjusted under 35 U.S.C. 154(b) by 390 days.

(21) Appl. No.: 10/451,798

(22) PCT Filed: Jan. 14, 2002

(86) PCT No.: PCT/DE02/00083

§ 371 (c)(1),
(2), (4) Date: Oct. 15, 2003

(87) PCT Pub. No.: WO02/055257

PCT Pub. Date: Jul. 18, 2002

(65) Prior Publication Data
US 2004/0134063 A1    Jul. 15, 2004

(30) Foreign Application Priority Data
Jan. 15, 2001   (DE) .................. 101 01 539

(51) Int. Cl.
B21D 53/84   (2006.01)
B21K 1/12    (2006.01)

(52) U.S. Cl. .......... 29/888.1; 29/452; 29/446; 29/433

(58) Field of Classification Search .......... 29/DIG. 35, 29/888.1, 433, 446, 450–452, 447, 525; 403/273
See application file for complete search history.

(56) References Cited

U.S. PATENT DOCUMENTS

| | | | |
|---|---|---|---|
| 4,211,192 A | 7/1980 | Baumgartner et al. | |
| 4,680,844 A * | 7/1987 | Rupp | 29/888 |
| 5,299,881 A | 4/1994 | Mettler-Friedli | |
| 5,845,384 A | 12/1998 | Retzbach | |
| 6,000,368 A * | 12/1999 | Mikame | 123/90.18 |
| 6,374,489 B1 * | 4/2002 | Yokoyama | 29/888.1 |

FOREIGN PATENT DOCUMENTS

| | | |
|---|---|---|
| DE | 3301749 | 8/1984 |
| DE | 195 21 755 | 10/1996 |
| GB | 896899 * | 5/1962 |
| GB | 954773 | 4/1964 |
| JP | 08093884 | 4/1996 |

* cited by examiner

Primary Examiner—David P. Bryant
Assistant Examiner—Christopher M Koehler
(74) Attorney, Agent, or Firm—Jacobson Holman PLLC

(57) ABSTRACT

A method of producing a built shaft in which at least one part, particularly a cam, is mounted on the shaft, particularly a camshaft, includes inserting the shaft into an opening of the part. Before mounting the part, the shaft is stretched by a stretching and tightening device such that an original diameter in the area of at least one fastening location is reduced to a stretched diameter. The part is slid onto the shaft and up to the fastening location. The stretching and tightening device is then loosened to enable the diameter of the shaft to enlarge once more towards its original diameter. The part is firmly fastened at the fastening location by an interference fit in both an axial and rotationally fixed manner.

13 Claims, 2 Drawing Sheets

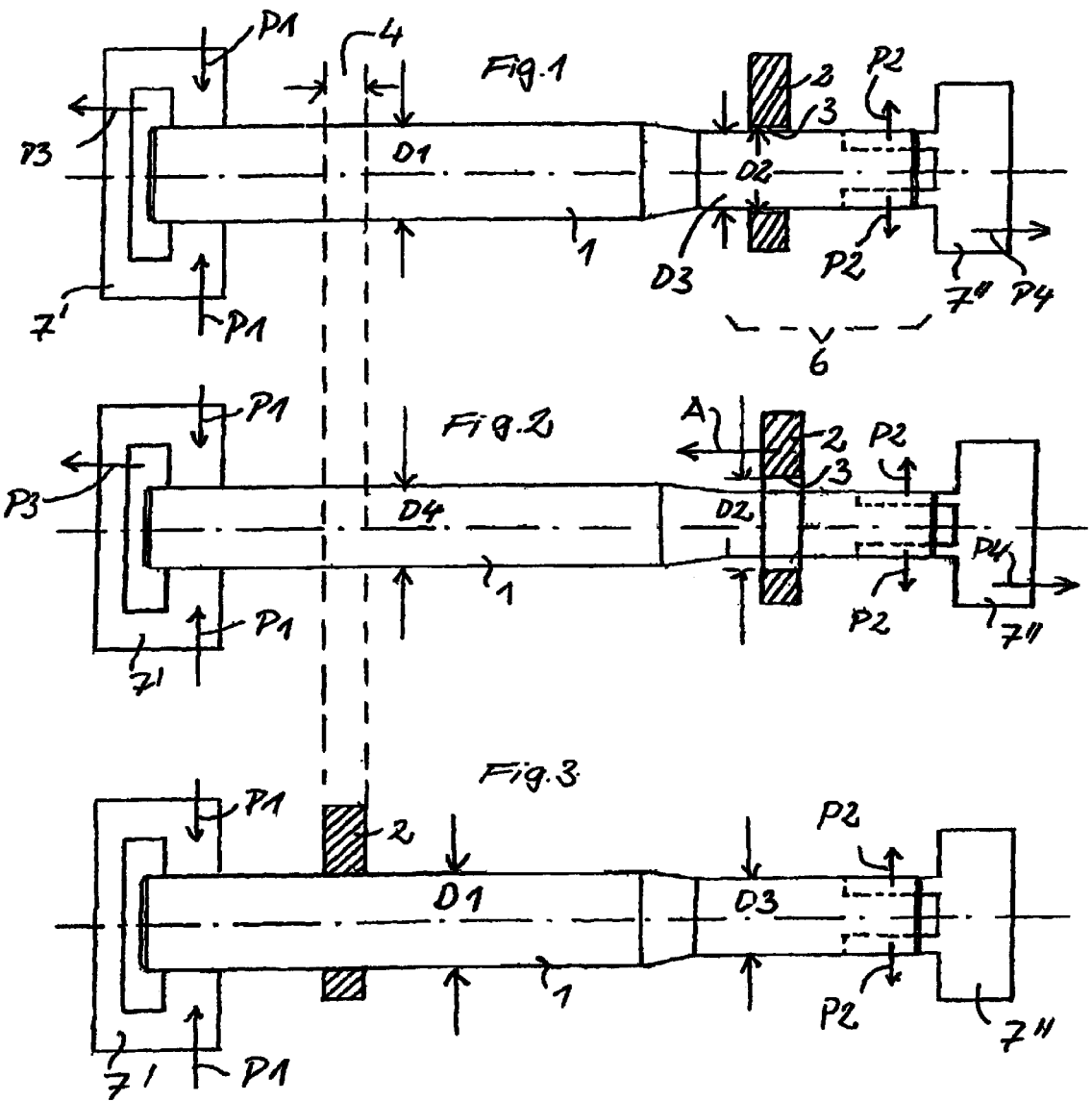

METHOD FOR PRODUCING A BUILT SHAFT

This is a nationalization of PCT/DE02/00083 filed Jan. 14, 2002 and published in German.

BACKGROUND OF THE INVENTION

1. Field of Invention

This invention relates to a method of producing a worked shaft by stretching the shaft to reduce its diameter, moving a component onto the stretched shaft, and terminating the stretching so that the shaft regains some of its original diameter and secures the component to the shaft. In particular, this invention relates to a method of producing worked camshafts.

2. Description of the Prior Art

To attach cams or other components to a camshaft, which is hollow in a manner that has long-term stability, it is known that prefabricated cams or components may be pushed onto the camshaft and to widen them hydraulically in some locations so that the cams and/or components are secured in a torsionally fixed manner. The locally limited widening of the camshaft is relatively complex because special provisions are required (special probes, seals, etc.).

U.S. Pat. No. 5,299,881 describes a worked camshaft in which the individual cams and the corresponding camshaft are first manufactured completely in separate manufacturing steps and then the cams are pushed onto the camshaft using a special joining technique so that there is a fit without play between the shaft and the cams. The prefabricated cams each have an inside bore and at least two annular zones spaced a distance apart axially, separated by at least one free space which is in the inside bore of the cams. The space and the zones are arranged symmetrically with the center plane of the cams. To manufacture the worked camshaft, the individual cams are pushed onto the camshaft in such a way that a fit is obtained between said zones and the circumference of the shaft. There is a problem inasmuch as it is relatively difficult and problematic to attach said shafts, in particular when the shafts are pushed onto or over the regions to which they are to be secured. Furthermore, the cams have a relatively complex design and therefore may be manufactured only at a comparatively high cost. SUMMARY OF THE INVENTION The object of the present invention is to create a method of manufacturing a worked shaft in which the mounting of cams and/or other components on the shaft can be accomplished relatively easily and inexpensively.

This object is achieved by a method of manufacturing a worked shaft that includes placing at least one component to be mounted on a shaft on a first portion of the shaft, the component having an inner opening with an inside diameter, and stretching the shaft such that in at least one shaft mounting site on a second portion of the shaft an original diameter is reduced to a stretched diameter that is larger than the component inside diameter. The method includes moving the component onto the second portion of the shaft and displacing the component to the mounting site by applying a force, and terminating the stretching such that the stretched diameter enlarges in a direction of the original diameter so as to secure the component to the shaft.

The essential advantage of the present invention is that complex hydraulic widening operations on a hollow shaft, in particular a camshaft such as those required in the related art need not be performed because the diameter of the shaft is reduced elastically by stretching before pushing the cams and/or other components onto the shaft, so that it is readily possible to push said cams and/or components onto the shaft. Advantageously, no complex changes need be made on the cams and/or components themselves in the implementation of the method according to this invention.

BRIEF DESCRIPTION OF THE DRAWINGS

The invention and the embodiments thereof are explained below in conjunction with the figures, which show:

FIG. 1 a camshaft and a cam to be mounted on it in a schematic diagram;

FIG. 2 a method step in which the diameter of the camshaft is elastically reduced by stretching;

FIG. 3 a cam mounted on the camshaft; and

DETAILED DESCRIPTION OF THE PREFERRED EMBODIMENTS

Figure 4:
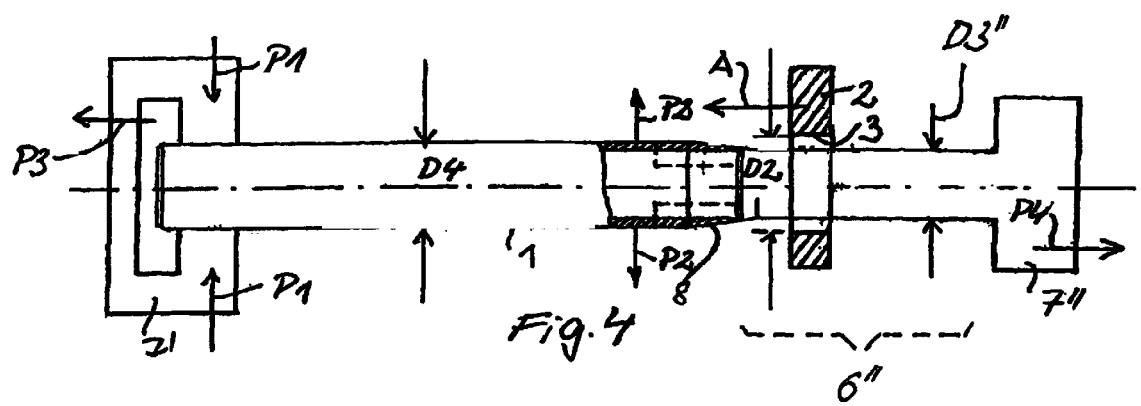
FIG. 4 a refinement of this invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

FIG. 1 shows a shaft, preferably designed as a hollow shaft, in particular a camshaft 1. A component to be mounted on the camshaft 1 may be, for example, a cam 2. The cam 2 has an inner opening 3 into which the camshaft 1 is inserted in the manner described below for mounting the cam 2 on the camshaft 1. The camshaft 1 has an outside diameter D1 at least at the mounting site 4 where the cam 2 is to be mounted. The inside diameter of the inner opening 3 of the cam 2 is labeled as D2.

A so-called threading area 6 having an outside diameter D3 preferably smaller than the diameter D2 and also smaller than the diameter D1 is provided on an end area of the camshaft 1 so that the cam 2 or other cams and/or components may be pushed onto the shaft there with some play and/or they may already be threaded onto the shaft.

In a method step, the end areas of the camshaft 1 are preferably mounted in a stretching and chucking device 7', 7". This stretching and chucking device 7', 7" is preferably created according to FIG. 1 so that it acts with a chucking element 7' on the outside circumference of the camshaft 1 and exerts a chucking force P1 on the camshaft 1. With its other chucking element 7", the stretching and chucking device 7', 7" acts on the inside circumference of the hollow camshaft 1, preferably exerting a chucking force P2 on the camshaft 1 acting in the radial direction. Before attaching the chucking element 7", the cams 2 and/or other components to be mounted on the camshaft 1 are pushed onto the threading area 6.

The camshaft 1 especially preferably has an inside thread on its side facing the chucking element 7" onto which an outside thread of the chucking element 7" can be screwed.

It is pointed out that the chucking element 7' may also be designed according to the chucking element 7".

The stretching and chucking device 7', 7" is subsequently operated so that a tension is exerted on the chucked camshaft 1 so that the diameter D1 of the camshaft 1 is reduced to a diameter D4. It holds that D1>D4>D3, as also shown in FIG. 2. The chucking elements 7' and 7" exert the stretching forces P3 and P4 thereby.

To permit the aforementioned reduction in the diameter D1 to the diameter D4 by operation of the stretching and chucking device 7', 7" and in stretching of the camshaft 1, the camshaft 1 is made of a material, preferably a special steel alloy, which permits an elastic axial elongation of the camshaft 1 due to the stretching and chucking device 7', 7" for said reduction in diameter. In addition to the elastic deformation, plastic deformation of the camshaft in stretching is also possible.

According to FIG. 2, the camshaft 2 is then pushed from the threading area 6 onto the stretched camshaft 1 having the diameter D4 and pushed in direction A to the mounting site. This is readily possible because the diameter D4 is smaller than the diameter D2. The cam 2 is secured at the fastening site 4 by retaining devices, which are not shown in greater detail here, with respect to displacement in the axial direction and in the circumferential direction.

It is also conceivable for the diameter D4 to be larger than the diameter D2 as long as it is certain that the cam 2 can then be shifted by use of force to the mounting site 4 after the stretching operation. A lubricant can also be supplied into the area between the cam 2 and the camshaft 1 for shifting the cam 2 on the camshaft 1.

When the stretching and chucking device 7', 7" according to FIG. 3 is released, the camshaft 1 returns in the direction of its original position shown in FIG. 1 due to the release and its elasticity, so that its outside diameter D4 increases again in the direction of the outside diameter D1. In doing so, the cam 2 is permanently secured in the mounting site 4 both axially and in a torsionally fixed manner by a press fit. The stretching and chucking device can then be removed.

According to FIG. 4, it is also conceivable to provide a threading area 6" on a chucking element 7" which acts on the inside circumference of the camshaft 1, instead of the threading area being located on the camshaft 1 (FIGS. 1 through 3) or to provide a threading area on two such chucking elements. In this case, the components and/or cams 2 to be mounted on the camshaft 1 are arranged on the threading area 6", the diameter of which is preferably smaller than the inside diameter of the inside opening 3 of the components and/or cams 2, before positioning the chucking element 7". After the stretching, then the components and/or cams 2 are pushed onto the camshaft 1 and brought into the predetermined position.

To permit the components and/or cams 2 to be pushed onto the camshaft 1 from the threading area 6", the camshaft 1 preferably has an approach ramp 8 which forms a transition from the diameter D3" of the threading area 6" to the diameter D4 of the stretched camshaft 1.

It is also pointed out that it is conceivable to use a shaft 1 having the original diameter D1, which is subsequently reduced in drawing to the diameter D4, only in the area of the mounting site(s) 4. The other shaft areas then have a diameter smaller than D1. These shaft areas are also reduced in drawing.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A method of manufacturing a worked shaft comprising the steps of:
    placing at least one component to be mounted on an at least partially hollow shaft on a threading area of a stretching and chucking device, the component having an inner opening with an inside diameter, the stretching and chucking device having at least one chucking element which acts on an inside circumference of the shaft, and the shaft having a component approach ramp area that facilitates movement of the component from the threading area to the shaft;
    stretching the shaft with the stretching and chucking device such that in at least one shaft mounting site on the shaft an original diameter is reduced to a stretched diameter that is larger than the component inside diameter;
    moving the component onto the shaft and displacing the component to the mounting site by applying a force; and
    releasing the stretching and chucking device such that the stretched diameter enlarges in a direction of the original diameter so as to mount the component on the shaft.

2. The method according to claim 1, wherein the stretching and chucking device has a second chucking element which acts on an outside circumference of the shaft.

3. The method according to claim 1, wherein the stretching and chucking device has two chucking elements acting on the inside circumference of the shaft.

4. The method according to claim 1, wherein the chucking element acting on the inside circumference of the shaft has an area with an outside thread which is threaded into an inside thread situated in the inside circumference of the shaft.

5. The method according to claim 1, wherein the shaft is hollow.

6. The method according to claim 1, further comprising supplying a lubricant to an area between the component and the shaft for shifting the component on the shaft.

7. The method according to claim 1, wherein the original diameter initially extends along substantially an entire length of the second portion of the shaft.

8. The method according to claim 1, wherein the original diameter initially extends only along the mounting site, and a remaining portion of the shaft has a diameter that is smaller than the original diameter.

9. The method according to claim 1, wherein the shaft is a camshaft and the mounted component is a cam.

10. The method according to claim 1, wherein the applied force is sufficient to overcome resistance between the stretched diameter of the shaft and the component inside diameter.

11. A method of manufacturing a worked shaft comprising the steps of:
    placing a component to be mounted on a shaft on a threading area of a stretching and chucking device, the component having an inner opening with an inside diameter and the shaft having a component approach ramp area that facilitates movement of the component from the threading area to the shaft;
    applying a force to stretch the shaft such that in at least one shaft mounting site on the shaft an original diameter is reduced to a stretched diameter that is larger than the component inside diameter;

displacing the component to the mounting site by applying a force sufficient to overcome resistance between the stretched diameter of the shaft and the component inside diameter; and removing the stretching force such that the stretched diameter increases toward the original diameter so as to securely mount the component on the shaft.

12. The method according to claim 11, wherein the shaft is solid.

13. The method according to claim 11, wherein the step of placing a component to be mounted on the shaft includes placing a plurality of components on the threading area of the stretching and chucking device.

* * * * *